(12) United States Patent
Barcat et al.

(10) Patent No.: US 9,127,718 B2
(45) Date of Patent: Sep. 8, 2015

(54) ROTATION DETECTION SET AND BEARING ASSEMBLY COMPRISING SUCH A DETECTION SET

(75) Inventors: Florian Barcat, Tours (FR); Sylvain Chaussat, Tours (FR); Pierrick Maze, Tours (FR)

(73) Assignee: AKTIEBOLAGET SKF, Gothenburg (SE)

(*) Notice: Subject to any disclaimer, the term of this patent is extended or adjusted under 35 U.S.C. 154(b) by 163 days.

(21) Appl. No.: 13/995,078

(22) PCT Filed: Dec. 17, 2010

(86) PCT No.: PCT/IB2010/003527
§ 371 (c)(1),
(2), (4) Date: Mar. 4, 2014

(87) PCT Pub. No.: WO2012/080780
PCT Pub. Date: Jun. 21, 2012

(65) Prior Publication Data
US 2014/0185973 A1    Jul. 3, 2014

(51) Int. Cl.
| | | |
|---|---|---|
| F16C 41/04 | (2006.01) |
| F16C 32/00 | (2006.01) |
| G01B 7/30 | (2006.01) |
| F16C 41/00 | (2006.01) |
| G01D 5/244 | (2006.01) |
| G01D 11/24 | (2006.01) |

(Continued)

(52) U.S. Cl.
CPC .............. *F16C 41/007* (2013.01); *G01B 7/30* (2013.01); *G01D 5/24433* (2013.01); *G01D 11/245* (2013.01); *G01P 1/026* (2013.01); *G01P 3/443* (2013.01); *G01P 3/487* (2013.01)

(58) Field of Classification Search
CPC .......... F16C 19/06; F16C 19/52; F16C 33/76; F16C 41/007; G01P 1/026; G01P 3/443; G01P 3/487; G01P 3/486; G01D 5/24414; G01D 11/245; G01B 7/30
USPC .......... 384/448, 456, 490, 548; 324/173–174, 324/207.12, 207.15, 207.25
See application file for complete search history.

(56) References Cited

U.S. PATENT DOCUMENTS

| | | | | |
|---|---|---|---|---|
| 4,948,277 A | * | 8/1990 | Alff | ................................ 384/448 |
| 5,002,287 A | * | 3/1991 | Eskilsson | ....................... 384/448 |

(Continued)

FOREIGN PATENT DOCUMENTS

| | | |
|---|---|---|
| DE | 4339894 A1 | 5/1994 |
| EP | 1746425 A1 | 1/2007 |

(Continued)

*Primary Examiner* — Marcus Charles
(74) *Attorney, Agent, or Firm* — Bryan Packjian; SKF USA Inc. Patent Dept.

(57) ABSTRACT

A rotation detection set comprises an encoder washer rotatable around a rotation axis, at least one sensor adapted to detect a rotation parameter of the encoder washer through an air gap, a support member for holding the sensor with respect to the rotation axis and a mounting member for immobilizing the support member with respect to a fixed structure. The mounting member is made of one piece of magnetic material and has a first wall located on the same side of the air gap as the encoder washer and a second wall located on the same side of the air gap as the sensor whereas a magnetic body of the encoder washer, the air gap and the sensor are located in a volume defined by the mounting member between the two walls.

8 Claims, 5 Drawing Sheets

(51) Int. Cl.
*G01P 1/02* (2006.01)
*G01P 3/44* (2006.01)
*G01P 3/487* (2006.01)

(56) References Cited

U.S. PATENT DOCUMENTS

| | | | |
|---|---|---|---|
| 5,309,094 A * | 5/1994 | Rigaux et al. | 324/174 |
| 5,530,344 A * | 6/1996 | Caillaut et al. | 324/174 |
| 6,741,073 B2 * | 5/2004 | Iwamoto et al. | 324/207.12 |
| 7,249,891 B2 | 7/2007 | Aoki et al. | |
| 8,136,994 B2 * | 3/2012 | Masuda | 384/448 |
| 2002/0030482 A1 * | 3/2002 | Iwamoto et al. | 324/174 |
| 2009/0096441 A1 * | 4/2009 | Masuda | 324/173 |

FOREIGN PATENT DOCUMENTS

| | | | |
|---|---|---|---|
| EP | 1933155 A | 6/2008 | |
| EP | 2078962 A1 | 7/2009 | |
| FR | 2927962 A1 | 8/2009 | |
| WO | WO 2010116207 A1 * | 10/2010 | G01P 3/44 |
| WO | WO 2010133924 A1 * | 11/2010 | G01P 1/02 |

* cited by examiner

ROTATION DETECTION SET AND BEARING ASSEMBLY COMPRISING SUCH A DETECTION SET

CROSS-REFERENCE TO RELATED APPLICATIONS

This application is the US national stage of International Application No. PCT/IB2010/003527 filed on Dec. 17, 2010, the contents of which are herein fully incorporated by reference.

TECHNICAL FIELD OF THE INVENTION

This invention relates to a rotation detection set used to detect a rotation parameter of an encoder washer rotating around a rotation axis. Such a set is particularly useful for detecting the rotation of a rotatable ring of a bearing with respect to a fixed ring.

This invention also relates to a bearing assembly comprising, amongst others, a rotation detection set as mentioned here-above.

BACKGROUND OF THE INVENTION

Generally speaking, a bearing comprises an inner ring and an outer ring adapted to rotate around a rotation axis, one with respect to the other. In a plain bearing, the two rings are in sliding contact. In a rolling bearing, several rolling bodies are installed between the two rings. These rolling bodies can be balls, rollers or needles. Thus, a rolling bearing can be, for instance, a ball bearing, a roller bearing or needle bearing.

In the field of bearings, it is known to use a tachometer in order to determine the rotation speed of a member supported by a bearing. As explained in EP-A-1 933 155, one can use an encoder washer with magnetic poles fast in rotation with a rotating ring of a bearing, and one or several sensors distributed around the encoder washer or located in front of it. An air gap is provided between the encoder washer and the or each sensor and detection of the rotation parameter occurs through this air gap, thanks to the variation of a magnetic field generated by the encoder washer.

Such a detection device can be used in a magnetically perturbed environment such as in the neighbourhood of an electric motor where high magnetic fields are generated between the stator and the rotor. Under such circumstances, the accuracy of the measure performed by the sensor or sensors can be affected by a surrounding perturbing magnetic field, in particular because of electromagnetic interference or EMI.

U.S. Pat. No. B-6,741,073 discloses several complicated devices meant to build a magnetic bypass in order to avoid influencing a magnetic sensor. This does not protect the sensor from a surrounding perturbing magnetic field.

U.S. Pat. No. B-7,249,891 teaches the use of a conductive member having an electromagnetic shielding effect on one side only of a sensor holder, which does not efficiently protect a sensor from a surrounding perturbing magnetic field.

SUMMARY OF THE INVENTION

This invention aims at solving these problems with a new rotation detection set which is efficient even if it works in a magnetically perturbed environment.

To this end, the invention concerns a rotation detection set comprising an encoder washer rotatable around a rotation axis, at least one sensor adapted to detect a rotation parameter of the encoder washer through an air gap, a support member for holding the sensor with respect to the rotation axis and a mounting member for immobilizing the support member with respect to a fixed structure. According to the invention, the mounting member is made of one piece of magnetic material and has a first wall located on the same side of the air gap as the encoder washer and a second wall located on the same side of the air gap as the sensor, whereas a magnetic body of the encoder washer, the air gap and the sensor are located in a volume defined by this mounting member between these two walls.

Thanks to the invention, the mounting member works as a magnetic shielding cover which protects the air gap, and thus the variable magnetic field produced by the encoder washer magnetic body, from perturbations coming from either sides of the air gap. The fact that the mounting member is made of one piece makes it economic and reliable.

In the present description, unless otherwise specified, the words "axial", "radial", "axially" and "radially" relate to the rotation axis of the encoder washer. A direction is "axial" when it is parallel to such an axis and a direction or an axis is "radial" when it is perpendicular to and secant with such an axis.

According to further aspects of the invention which are advantageous but not compulsory, the rotation detection set might incorporate one or several of the following features, taken in any technically admissible combination:

- A third wall of the mounting member connects its first and second walls and it is perpendicular to the first and second walls.
- The third wall is provided with a hole for the connection of the sensor to an electronic device.
- The support member has an extension engaged within the hole of the mounting member and this extension defines a housing where the sensor is accommodated.
- The rotation detection device includes several sensors and all these sensors are accommodated in the housing of the extension.
- The first and second walls are parallel to the rotation axis of the encoder washer.
- The mounting member is ferromagnetic, in particular made of iron or an iron-based alloy.

The invention also concerns a bearing assembly comprising a bearing, with a fixed ring and a rotatable ring, and a rotation detection set as mentioned here-above, the encoder washer of the rotation detection set being fast in rotation with the rotatable ring and the support member being immobilized by the mounting member with respect to the fixed ring.

Advantageously, the mounting member is affixed onto the fixed ring of the bearing by elastic deformation of the mounting member.

BRIEF DESCRIPTION OF THE DRAWINGS

The invention will be well understood on the basis of the following description which is given in correspondence with the annexed figures and as an illustrative example, without restricting the object of the invention. In the annexed figures.

DESCRIPTION OF SOME EMBODIMENTS

Figure 1:
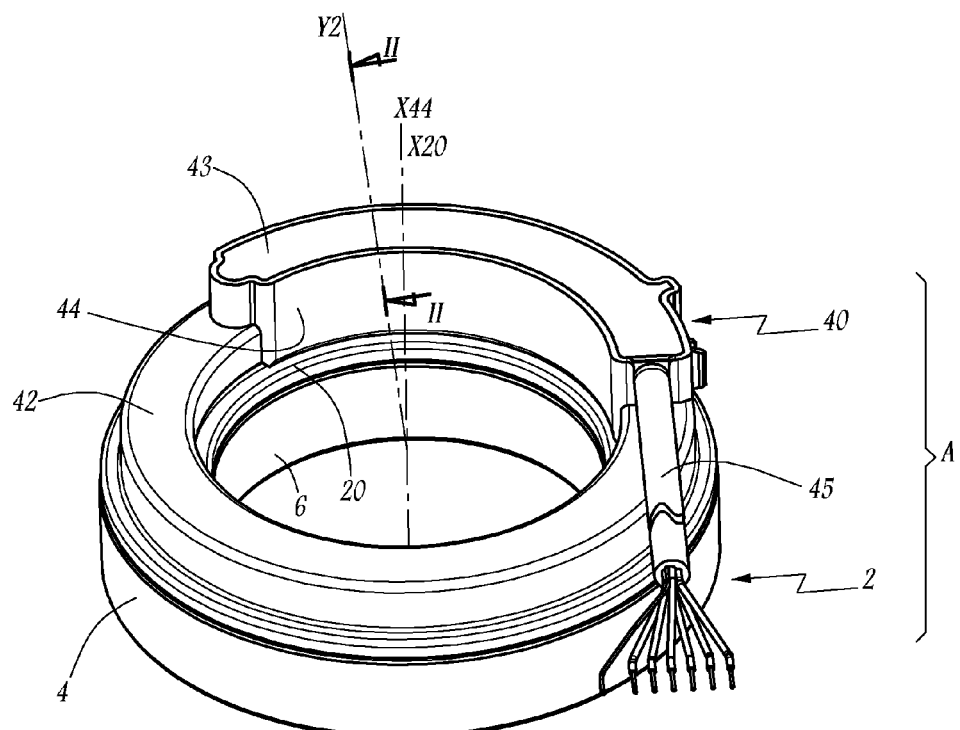
FIG. 1 is a perspective view of a rolling bearing assembly according to the invention.

The rolling bearing assembly A represented on the figures comprises a rolling bearing 2 having a fixed outer ring 4 and an inner ring 6 rotating around a central axis X2 of rolling bearing 2. Several balls 8 forming rolling bodies are received within a chamber 10 defined between rings 4 and 6. These balls are held in position with respect to these rings by a cage 12.

An encoder washer 20 is fast in rotation with inner ring 6 and comprises a metallic armature 22 and a magnetic body 24 which defines several North and South magnetic poles. Encoder washer 20 is centered on an axis X20 superimposed with axis X2 when encoder washer 20 is mounted onto inner ring 6 by snapping of armature 22 within an inner peripheral groove 6A of ring 6. The respective North and South poles, N and S, of magnetic body 24 are distributed around axis X20 and α denotes the polar pick of these poles, that is the top angle of an angular sector comprising one North pole and one South pole. In the example of the figures, angle α equals 90°.

A sensing device 40 is mounted onto outer ring 4 in order to detect a rotation parameter of encoder washer 20, thanks to the variable magnetic field generated by this washer upon rotation. A rotation parameter can be a position, a speed, an acceleration or any other parameter representative of the rotation of encoder washer 20 around axes X2 and X20.

Sensing device 40 includes an annular flange 42 having a peripheral skirt 422 adapted to be elastically snapped within an outer groove 4A of the outer ring. Flange 42 is centered on an axis X42 which is superimposed with axis X2 when sensing device 40 is mounted on rolling bearing 2. Flange 42 is provided with an inner radial peripheral wall 421 and an outer radial peripheral wall 423. These walls are parallel to axis X42. Flange 42 is also provided with a third flat wall 424 which is perpendicular to walls 421 and 423 and to axis X42 and connects walls 421 and 423. Wall 424 is provided with an oblong opening or through hole 426, of an arcuate shape centered on axis X42.

Sensing device 40 also includes a support member 44 of an arcuate shape, having an inner wall 441 in the form of a section of a circular cylinder centered on an axis X44 which is superimposed with axes X2 and X42 when support member 44 is mounted onto flange 42 and sensing device 40 is mounted onto outer ring 4. Support member 44 also has an outer wall 442, which is parallel to inner wall 441, and a flat wall 443 which is perpendicular to axis X44 and lies against flat wall 424 when support member 44 is mounted onto flange 42. Flat wall 443 connects inner wall 441 to outer wall 442.

Three circular holes 428 are also provided on wall 424 in order to guarantee a robust mechanical anchorage of support member 44 onto flange 42. Indeed, in case support member 44 is overmolded onto flange 42, some plastic material flows through holes 428 and remains there after solidification.

The geometry of support member 44 is defined in connection to axis X44. For the parts of support member 44, the words "axial" or "radial" are defined with respect to this axis.

Flat wall 443 has an arcuate opening 444 which communicates with the inside volume $V_{445}$ of a hollow extension 445 protruding from the side of flat wall 443 which is supposed to lie against flat wall 424 in a mounted configuration of sensing device 40.

The global shape of extension 445 is such that it can be inserted within opening 426 when support member 44 is mounted onto flange 42. Thus, extension 445 is arcuate and centered on axis X44.

Five slots $S_{445}$ are defined within volume $V_{445}$ by four ribs 446. Each rib separates two adjacent slots $S_{445}$ and is centered on a plane $P_{446}$ which is radial with respect to axis X44.

The radial outer wall 447 of extension 445 is formed by five wall portions whose faces 447A to 447D oriented towards volume $V_{445}$ are flat and oriented at an angle of 7.2° with respect to the adjacent portion or portions. The radial inner wall 448 of extension 445 is formed by five wall portions whose faces 448A to 448D oriented towards volume $V_{445}$ are flat, oriented at an angle of 7.2° with respect each other and separated by a rib 446. Each rib 446 extends from wall 448 towards wall 447 on a length which is less than the radial distance between walls 447 and 448. Thus, the five slots $S_{445}$ are joined by an empty part of volume $V_{445}$ which extends continuously along wall 447.

449 denotes the bottom wall of extension 445, that is its wall opposite to opening 444. 449A denotes the upper face of wall 449 oriented towards volume $V_{445}$.

Figure 4:
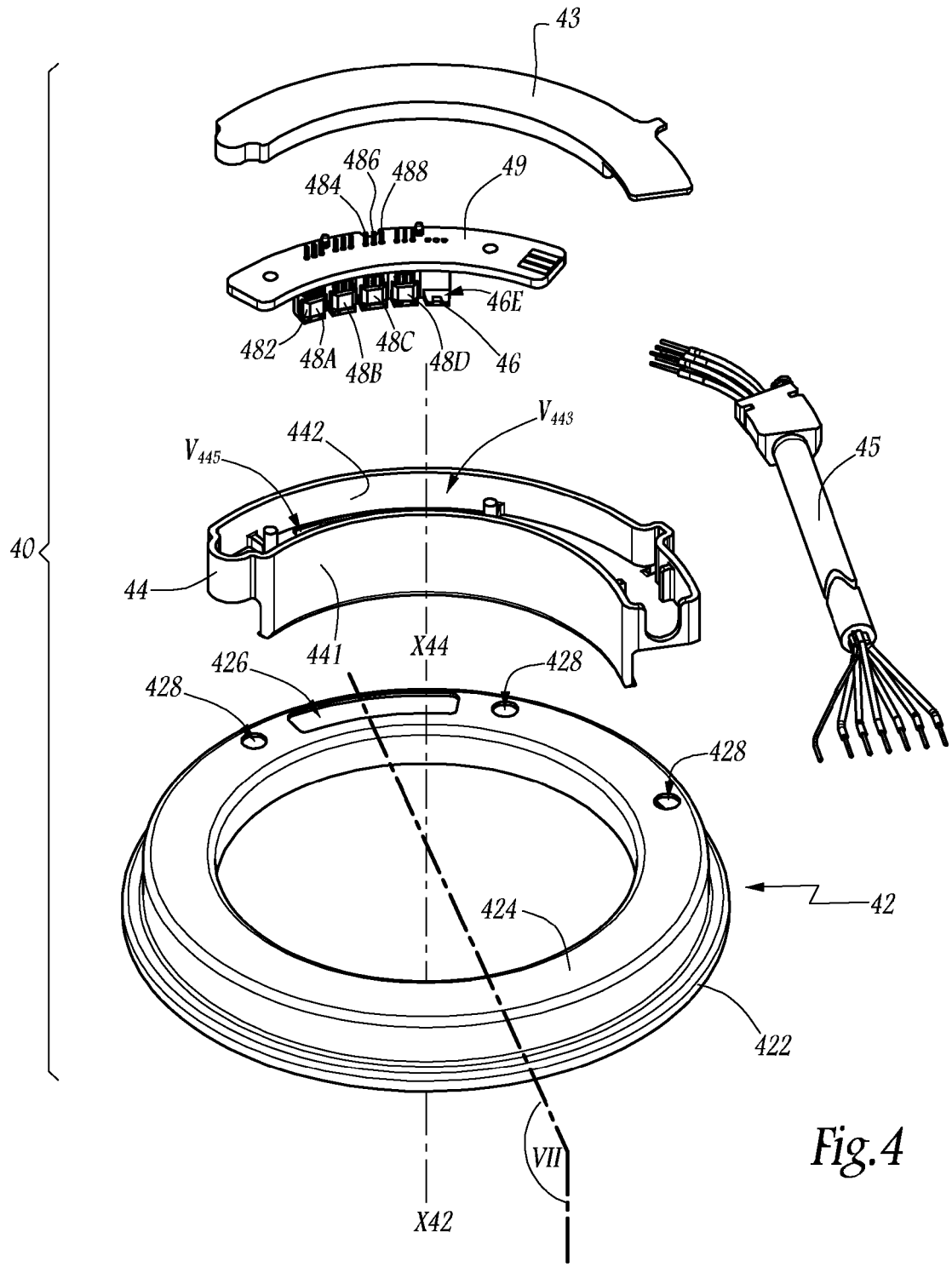
FIG. 4 is an exploded perspective view of a rotation detection device of a rotation detection set belonging to the rolling bearing assembly of FIGS. 1 to 3.
Figure 5:
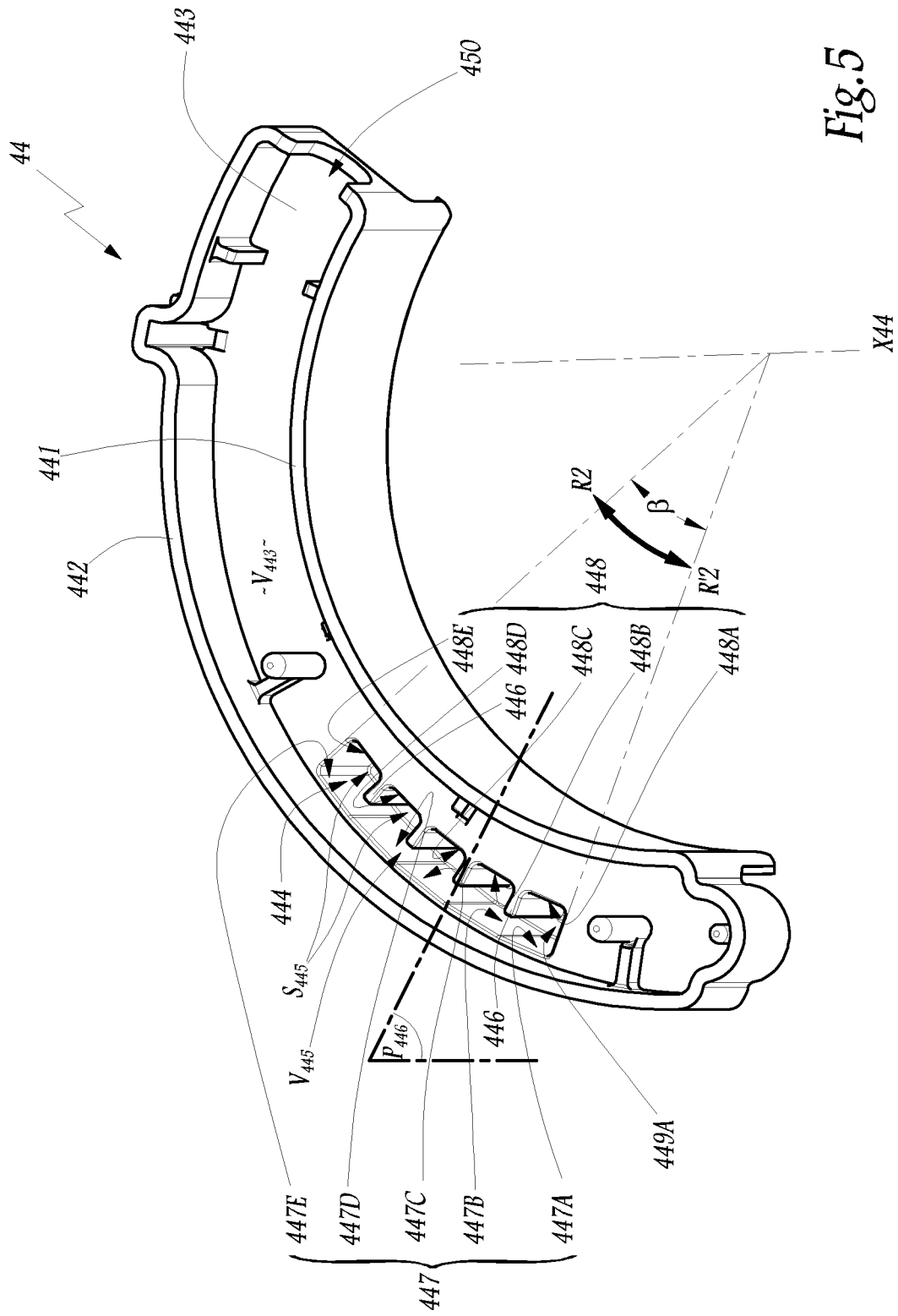
FIG. 5 is a perspective view of a support member of the rotation detection device of FIG. 4.
Figure 6:
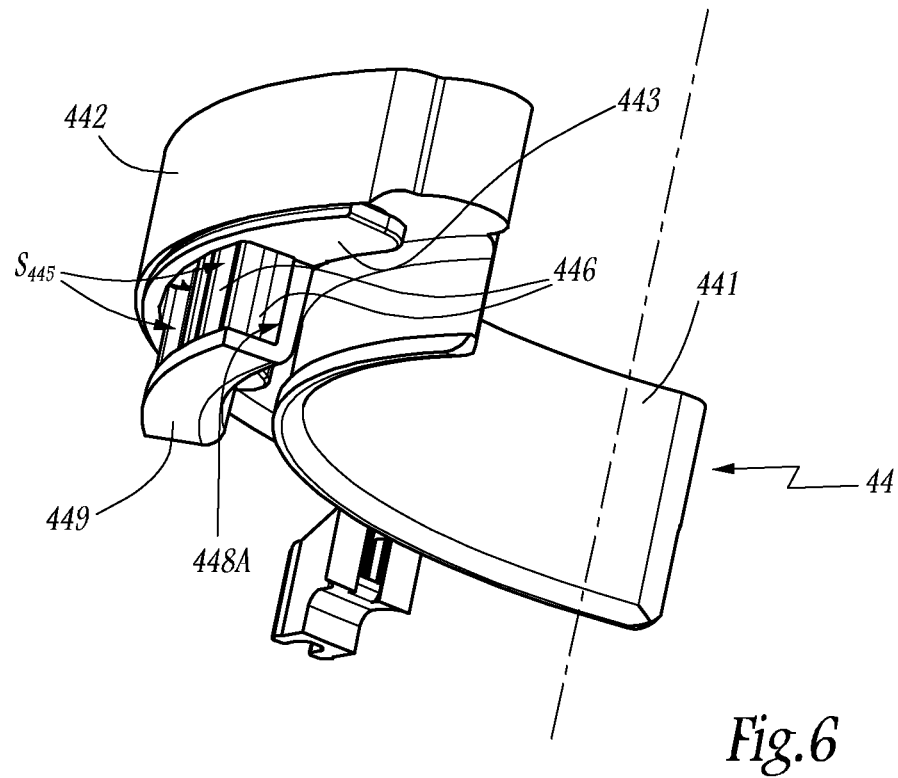
FIG. 6 is another perspective view, with a different angle, of the support member of FIG. 5.
Figure 7:
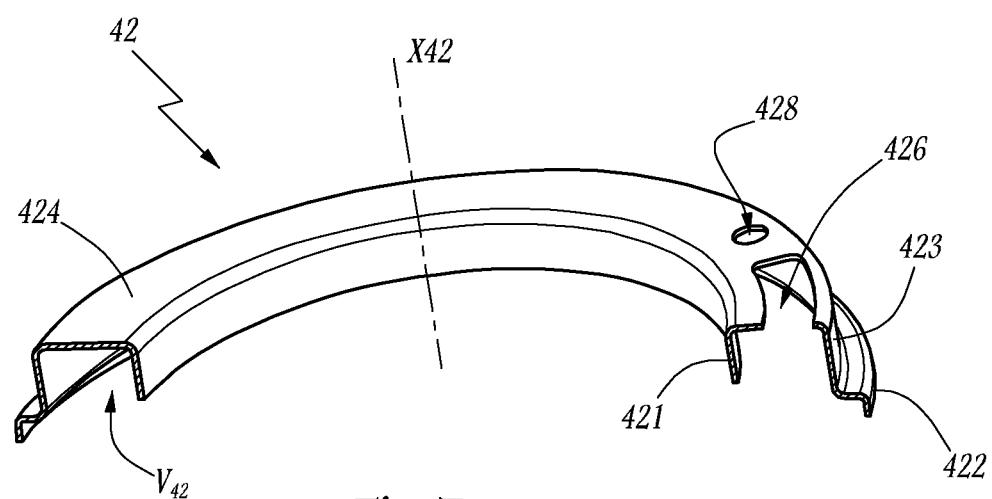
FIG. 7 is a cut and perspective view along plane VII on FIG. 4, the mounting member being seen from another angle.

A holder 46 is provided for five sensors which are identical. Four sensors are represented on FIG. 4 with references 48A, 48B, 48C and 48D. The fifth sensor is omitted in order to show holder 46. Each sensor has a body 482 including a non represented detecting cell, such as a Hall effect cell. Each sensor also has three pins 484, 486 and 488 for its connection to a printed circuit board or PCB 49.

The holder 46 has five recesses, each adapted to accommodate and hold in position a body of a respective sensor. One such recess is shown on FIG. 4 with reference 46E. It is adapted to accommodate the non represented sensor.

The geometry of holder 46 is chosen in such a way that, when it is in place within volume $V_{445}$, holder 46 presses the front face 483 of each sensor body 482 against a wall portion face 448A to 448E of inner wall 448.

In addition, the sensor bodies are each individually received within a slot $S_{445}$.

When they are received within volume $V_{445}$, sensors 48A to 48D are distributed on an arc of a geometrical circle centered on axis X44.

When holder 46 is in place within volume $V_{445}$, PCB 49 lies within a volume $V_{443}$ which is defined between walls 441 and 442, on the side of flat wall 443 opposite to extension 445. This volume $V_{443}$ forms a housing for this PCB. The ends of a multiconductor cable 45 are connected to PCB 49 within volume $V_{443}$ and cable 45 enters volume $V_{443}$ via a slot 450 of support member 44.

When they are received within volume $V_{445}$ and when support member 44 is mounted on flange 42 in such a way that extension 445 goes through hole 426, sensors 48A to 48D face magnetic body 24 and an air gap G is defined between their respective bodies 482 and the radial outer surface 26 of magnetic body 24.

Figure 2:
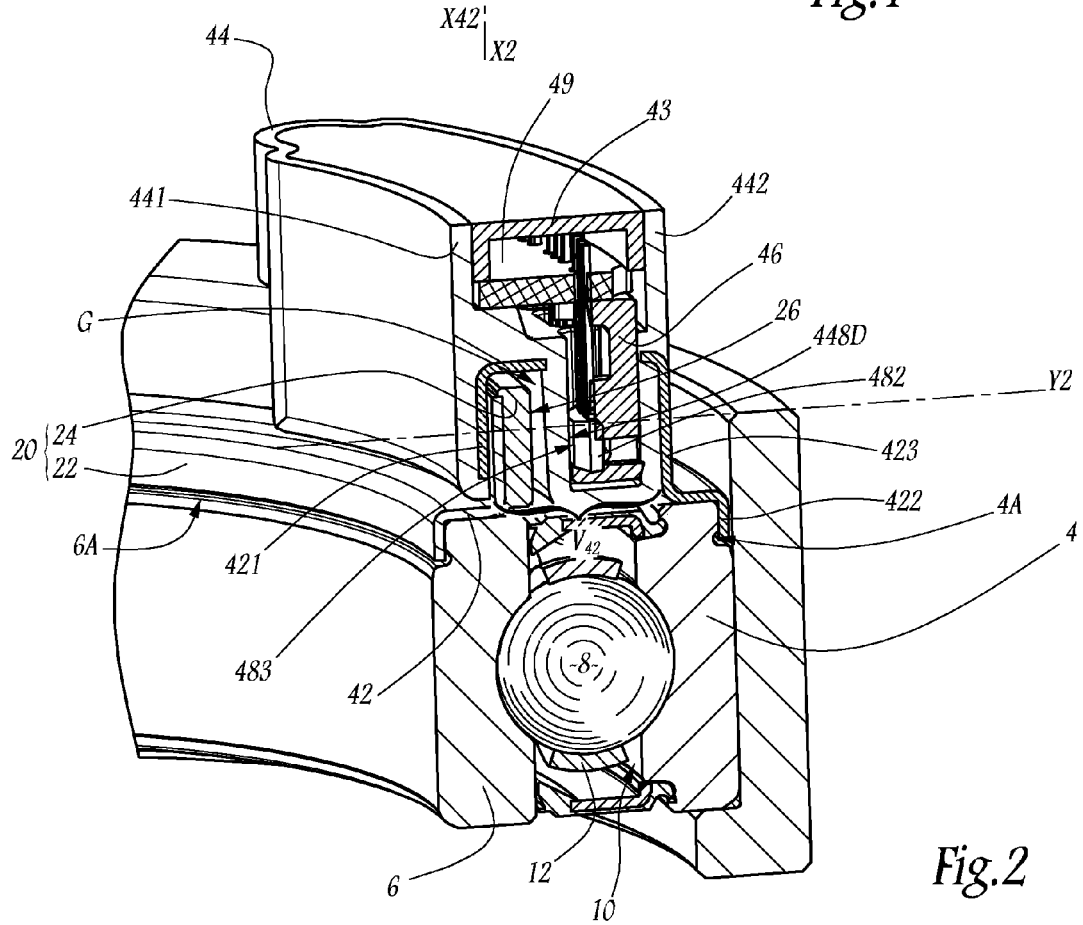
FIG. 2 is a partial cut view along line II-II on FIG. 1.
Figure 3:
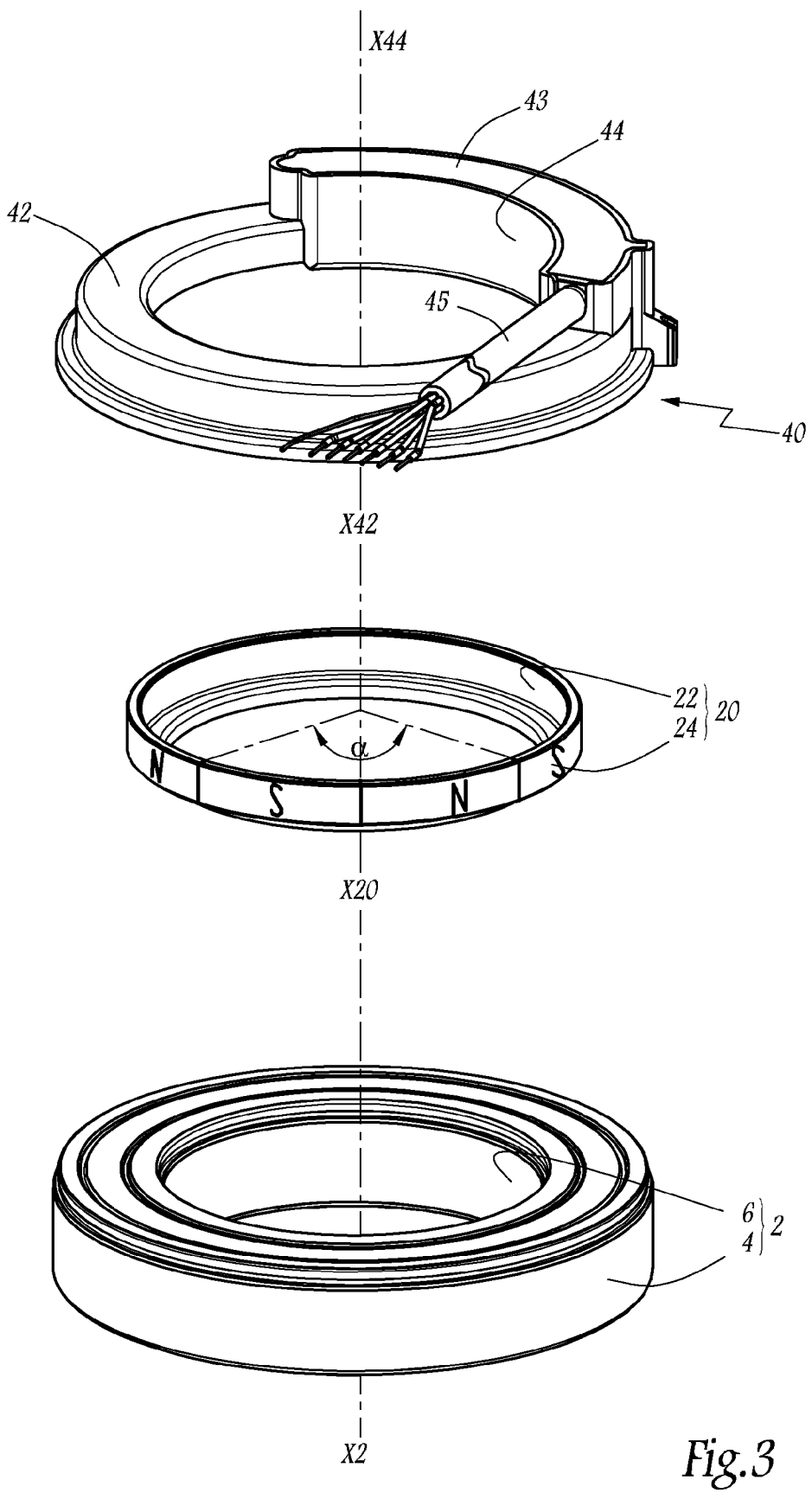
FIG. 3 is an exploded perspective view of the rolling bearing assembly of FIG. 1.

Since extension 445 is introduced within through hole 426, air gap G is located within an annular inner volume $V_{42}$ defined by flange 42, radially between walls 421 and 423. Along axis X42, volume $V_{42}$ is limited, in a direction away from skirt 422, by wall 424. Volume $V_{422}$ is open in a direction away from wall 424. In other words, the cross section of flange 42 at the level of volume $V_{42}$ is an inverted U with a flat bottom. As shown on FIG. 2, magnetic body 24 of encoder washer 20 is located, along an axis Y2 which is radial with respect to axis X2, between air gap G and wall 421. On the other hand, the respective bodies 482 of sensors 48A-48D, are located, along axis Y2, between air gap G and wall 423. Thus, air gap G, magnetic body 24 and sensors bodies 482 of all sensors are located within volume $V_{42}$.

Thus, walls 421, 423 and 424 of flange 42 form a shielding cover for air gap G and protect it from a potentially magnetically perturbated environment, so that the detection, obtained with encoder washer 20 and sensors 48A to 48D and the fifth sensor, is accurate.

A particularly compact configuration is obtained insofar as first wall 421 is located on the same side of air gap G as encoder washer 20, whereas second wall 423 is located on the same side as air gap G as a sensors 48A to 48D and the fifth sensor.

A rotation detection set according to the invention includes encoder washer 20 and sensing device 40. During manufacturing of this rotation detection set, the sensors are mounted onto holder 46. Then, PCB 49 is mounted onto holder 46. Connection of the pins of the sensors to the PCB can then be made by soldering.

The sub-assembly made of parts 46, 48A-48D and 49 and the fifth sensor can be easily manipulated while the respective positions of the sensors one with respect to the other are held by holder 46. It is then possible to connect PCB 49 to cable 45 and to push holder 46 within volume $V_{445}$ and PCB 49 and the end of cable 45 within volume $V_{443}$.

Volume $V_{443}$ can then be closed with a cover 43.

Support member 44 equipped with items 43, 45, 46, 48A to 48E and 49 is compact and can then be mounted onto flange 42 to finalize rotation detecting device 40, ready to be used with encoder washer 20.

Alternatively, support member 44 can be overmolded on flange 42, which guarantees a firm immobilization of support member 44 onto flange 42.

Then, when it is necessary to know a rotation parameter of inner ring 6 with respect to outer ring 4, one mounts encoder washer 20 onto inner ring 6 and rotation detection device 40 onto outer ring 4. Cable 45 is then connected to a non represented electronic control unit.

Mounting of rotation detection device 40 onto outer ring 4 occurs by inserting skirt 422 within groove 4A which is obtained by a slight elastic deformation of skirt 422.

Thus, flange 42 has a double function: it is used for immobilizing support member 44 with respect to fixed ring 6 and to create a magnetic shield for air gap G thanks to volume $V_{42}$ where magnetic body 24 and sensor bodies 482 can be located and protected from a surrounding perturbating magnetic field.

Flange 42 is made of a ferromagnetic material, such as iron or an iron-based alloy.

Even if it is particularly advantageous, holder 46 is optional. It is possible to install individually the sensors 48A to 48D and the fifth sensor within the housing $V_{445}$, provided that the internal shape of extension 445 is adapted to efficiently hold each sensor in position. This is the case if the housing has slots.

The invention has been represented with five sensors. However, it can be implemented with one or several sensors, whose number can be different from five.

The invention has been represented with a rolling bearing. However, it is also usable with a plain bearing.

The invention has been represented with a fixed outer ring and a rotating inner ring. However, it is also usable with a fixed inner ring and a rotating outer ring.

The invention claimed is:

1. A rotation detection set comprising:
    an encoder washer rotatable around a rotation axis;
    at least one sensor adapted to detect a rotation parameter of the encoder washer through an air gap;
    a support member for holding the at least one sensor with respect to the rotation axis; and
    a mounting member for immobilizing the support member with respect to a fixed structure,
    wherein the mounting member is made of one piece of magnetic material and has a first wall located on the same side of the air gap as the encoder washer, a second wall located on the same side of the air gap as the at least one sensor, and a third wall connecting the first and second walls, the third wall being perpendicular to the first and second walls, and
    wherein a magnetic body of the encoder washer, the air gap and the at least one sensor are located in a volume defined by the mounting member between the first and second walls.

2. The rotation detection device according to claim 1, wherein the third wall is provided with a hole for the connection of the at least one sensor to an electronic device.

3. The rotation detection device according to claim 2, wherein the support member has an extension engaged within the hole and defining a housing where the at least one sensor is accommodated.

4. The rotation detection device according to claim 3, wherein at least one of the at least one sensor is accommodated in the housing of the extension.

5. The rotation detection device according to claim 1, wherein the first and second walls are parallel to the rotation axis.

6. The rotation detection device according to claim 1, wherein the mounting member is ferromagnetic, and made of iron or an iron-based alloy.

7. A bearing assembly comprising:
    a bearing with a fixed ring and a rotatable ring; and
    a rotation detection set having:
        an encoder washer rotatable around a rotation axis,
        at least one sensor adapted to detect a rotation parameter of the encoder washer through an air gap,
        a support member for holding the at least one sensor with respect to the rotation axis,
        a mounting member for immobilizing the support member with respect to a fixed structure,
        wherein the mounting member is made of one piece of magnetic material and has a first wall located on the same side of the air gap as the encoder washer, a second wall located on the same side of the air gap as the at least one sensor, and a third wall connecting the first and second walls, the third wall being perpendicular to the first and second walls, and
        wherein a magnetic body of the encoder washer, the air gap and the at least one sensor are located in a volume defined by the mounting member between the two walls, and
    wherein the encoder washer of the rotation detection set is rotatably fastened with the rotatable ring and the support member being immobilized by the mounting member with respect to the fixed ring.

8. The bearing assembly according to claim 7, wherein the mounting member is affixed onto the fixed ring by elastic deformation of the mounting member.

* * * * *